United States Patent
Ogasawara

(10) Patent No.: US 11,244,423 B2
(45) Date of Patent: Feb. 8, 2022

(54) IMAGE PROCESSING APPARATUS, IMAGE PROCESSING METHOD, AND STORAGE MEDIUM FOR GENERATING A PANORAMIC IMAGE

(71) Applicant: CANON KABUSHIKI KAISHA, Tokyo (JP)

(72) Inventor: Taku Ogasawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/987,690

(22) Filed: Aug. 7, 2020

(65) Prior Publication Data

US 2021/0056662 A1    Feb. 25, 2021

(30) Foreign Application Priority Data

Aug. 23, 2019    (JP) .............................. JP2019-153187

(51) Int. Cl.
| | | |
|---|---|---|
| *G06T 3/00* | (2006.01) | |
| *G06F 3/0488* | (2013.01) | |
| *G06T 19/00* | (2011.01) | |

(52) U.S. Cl.
CPC ........ *G06T 3/0087* (2013.01); *G06F 3/04883* (2013.01); *G06T 19/00* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2008/0066000 A1* | 3/2008 | Ofek | ...................... G06F 16/29 715/757 |
| 2014/0125761 A1* | 5/2014 | Morimura | ............. G06T 3/0062 348/36 |
| 2018/0039371 A1* | 2/2018 | Ko | .................... H04N 21/21805 |
| 2018/0144547 A1* | 5/2018 | Shakib | .................... G06T 15/60 |
| 2019/0158729 A1* | 5/2019 | Takaoka | ............. H04N 5/23238 |

FOREIGN PATENT DOCUMENTS

JP    2017-005339 A    1/2017

* cited by examiner

*Primary Examiner* — Edward Martello
(74) *Attorney, Agent, or Firm* — Carter, DeLuca & Farrell LLP

(57) ABSTRACT

An image processing apparatus comprises an image obtaining unit that obtains image data based on image capturing by a plurality of image capture apparatuses configured to capture images in an imaging area from different positions, and a panoramic image generation unit that generates, based on the image data obtained by the image obtaining unit, a panoramic image including images in directions within a predetermined range based on a specific position in the imaging area, the panoramic image having an enlargement rate of an image in a specific direction included in the predetermined range which is larger than the enlargement rates of images in other directions.

13 Claims, 9 Drawing Sheets

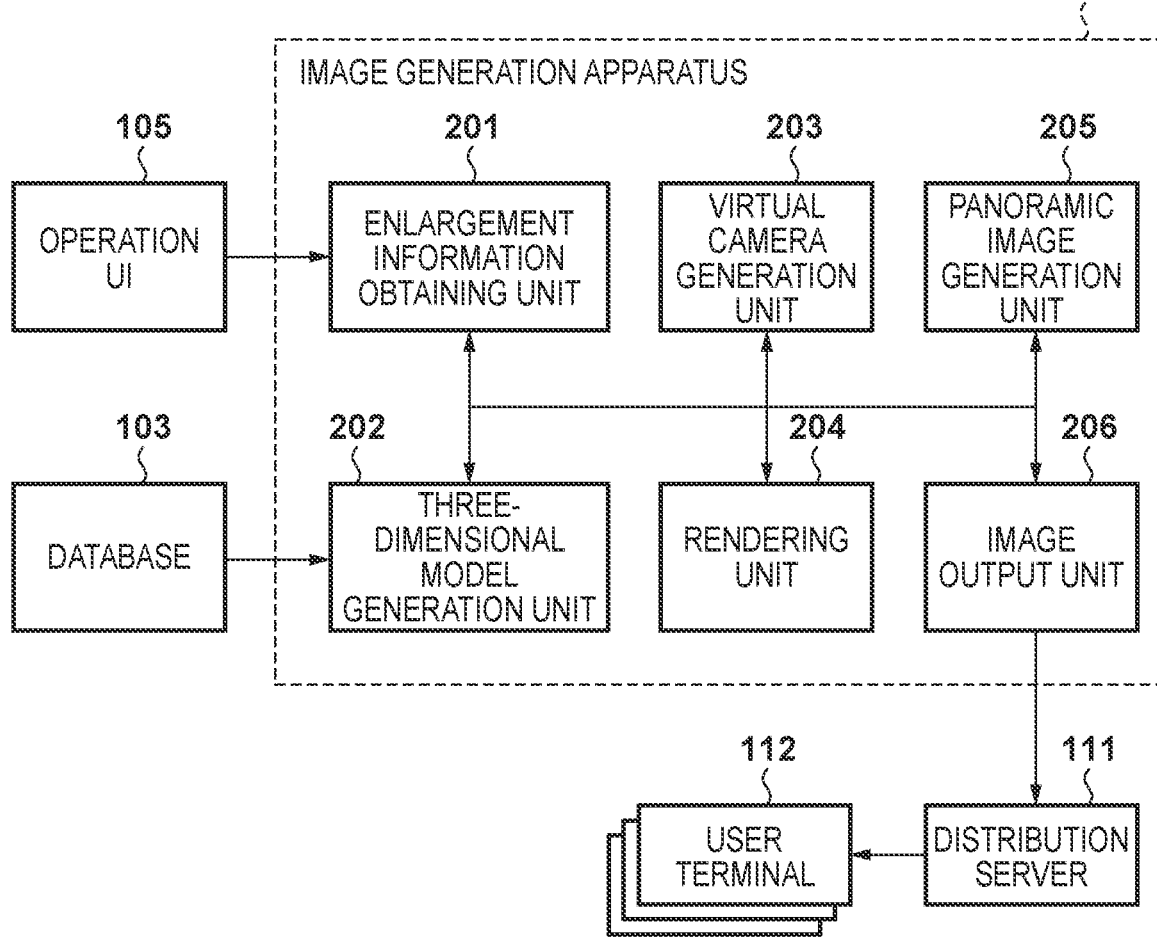
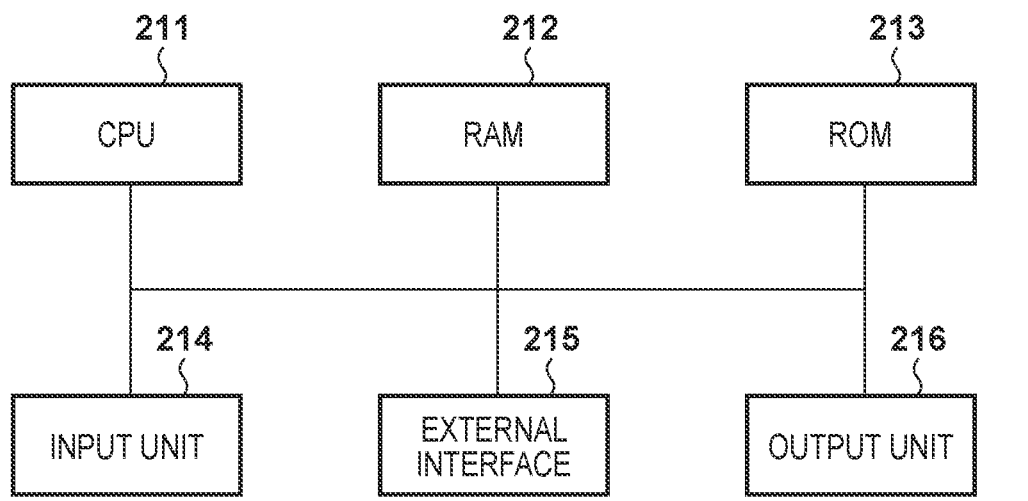

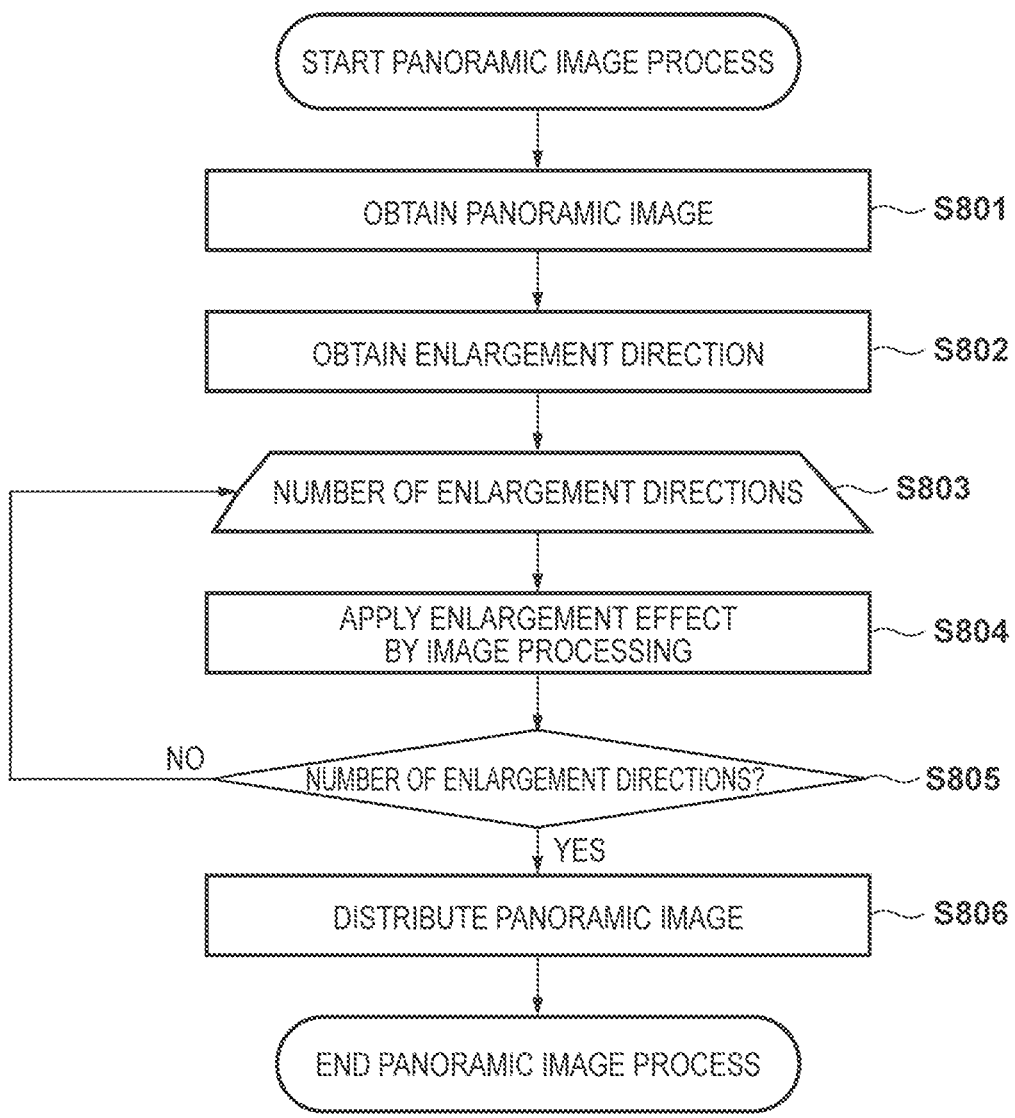

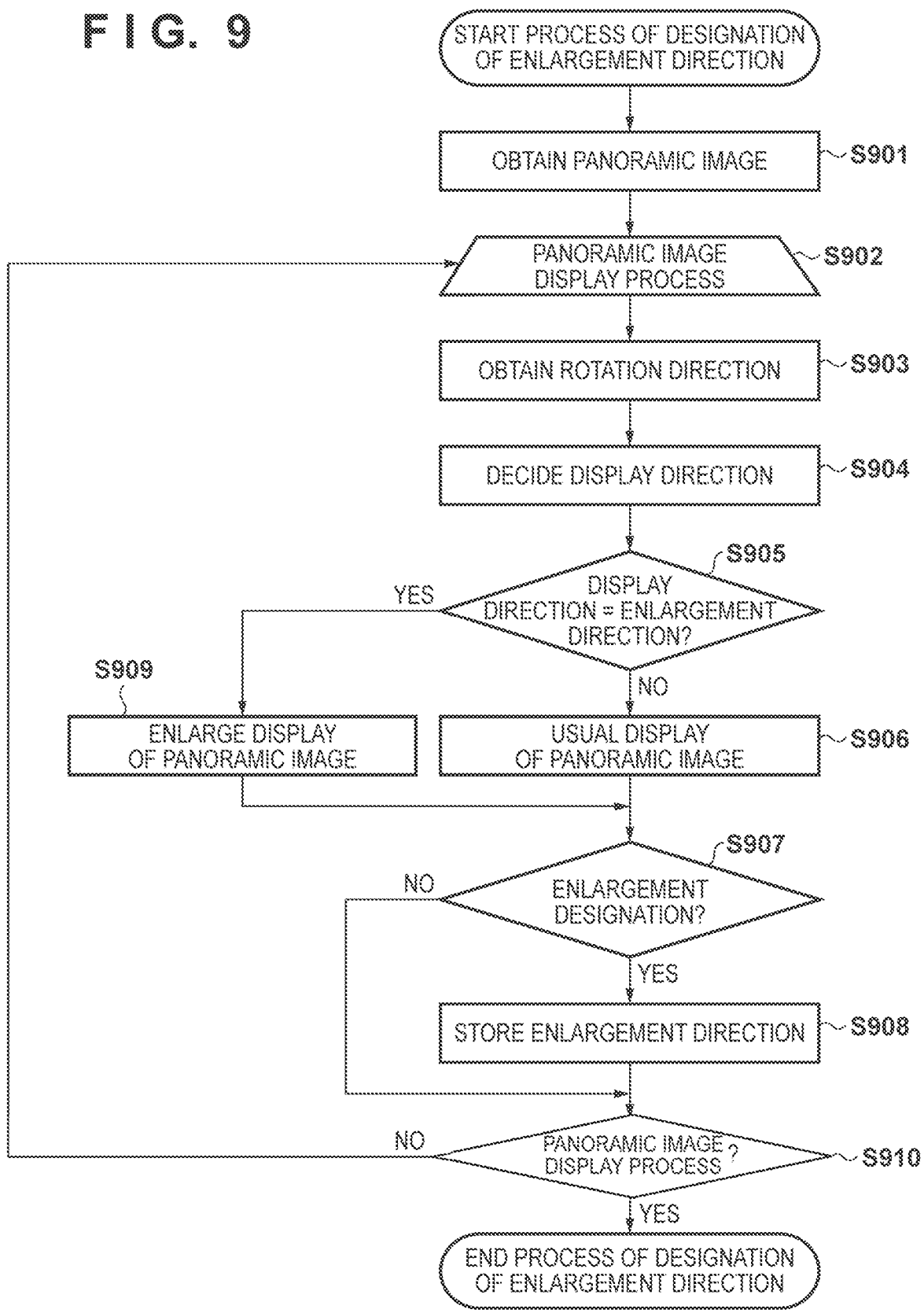

IMAGE PROCESSING APPARATUS, IMAGE PROCESSING METHOD, AND STORAGE MEDIUM FOR GENERATING A PANORAMIC IMAGE

BACKGROUND

Field

The present disclosure relates to an image processing apparatus, an image processing method, and a storage medium.

Description of the Related Art

Panoramic images are drawing attention which allow freely viewing information across a maximum of 360 degrees in each frame of an image. When a viewer selects a desired direction when reproducing a panoramic image, a part of the image corresponding to the selected direction is cut out and displayed from the entire image across 360-degrees.

Japanese Patent Laid-Open No. 2017-005339 discloses a technique for generating a panoramic image and clipping a partial area thereof. According to Japanese Patent Laid-Open No. 2017-005339, it is possible to capture an image using an image capture apparatus including wide-angle lenses provided on the front side and the back side of the apparatus, and generate a panoramic image, with the base point being the position where the image capture apparatus is placed. The base point is a reference position at which a panoramic image is generated. For example, in the case of a panoramic image encompassing the entire 360-degree periphery being a target, its center position turns out to be the base point.

The panoramic image presented in Japanese Patent Laid-Open No. 2017-005339 is an image captured at a same focal distance to the entire periphery centered on the image capture apparatus. Accordingly, when displaying a panoramic image, images in respective directions are displayed with a same enlargement rate. On the other hand, it is conceivable that a user viewing panoramic images wants to view an image in a specific direction being enlarged while viewing images in various directions. For example, when reproducing captured panoramic images of a soccer game, it is conceivable that a user may perform an enlargement operation each time the user displays an image in the goal direction, and perform a reduction operation when displaying images in other directions. However, such an operation turns out to be troublesome for the user.

SUMMARY

According to one aspect of the present invention, there is provided an image processing apparatus comprising: an image obtaining unit configured to obtain image data based on image capturing by a plurality of image capture apparatuses configured to capture images in an imaging area from different positions; and a panoramic image generation unit configured to generate, based on the image data obtained by the image obtaining unit, a panoramic image including images in directions within a predetermined range based on a specific position in the imaging area, the panoramic image having an enlargement rate of an image in a specific direction included in the predetermined range which is larger than the enlargement rates of images in other directions.

According to another aspect of the present invention, there is provided an image processing method comprising: accepting an input designating a direction corresponding to a partial image to be displayed, the partial image included in a panoramic image including images in a predetermined range of directions based on a specific position; and displaying, on a display screen, a partial image corresponding to a direction in accordance with the accepted input, wherein an enlargement rate of a partial image to be displayed when an input designating a specific direction included in the predetermined range is accepted is larger than an enlargement rate of a partial image to be displayed when an input designating other directions is accepted.

According to another aspect of the present invention, there is provided a non-transitory computer-readable storage medium storing a program for causing a computer to execute an image processing method, the image processing method comprising: obtaining image data based on image capturing by a plurality of image capture apparatuses configured to respectively capture images in an imaging area from different positions; and generating, based on the obtained image data, a panoramic image including images in directions within a predetermined range based on a specific position in the imaging area, the panoramic image having an enlargement rate of an image in a specific direction included in the predetermined range which is larger than the enlargement rates of images in other directions.

Further features of the present disclosure will become apparent from the following description of exemplary embodiments with reference to the attached drawings.

BRIEF DESCRIPTION OF THE DRAWINGS

FIGS. 2A to 2B are block diagrams illustrating a configuration example of an image generation apparatus.

FIG. 8 is a flowchart illustrating an enlargement process of a panoramic image in a distribution server.

FIG. 9 is a flowchart illustrating a process of designating an enlargement direction on a user terminal.

DESCRIPTION OF THE EMBODIMENTS

Figure 1A:
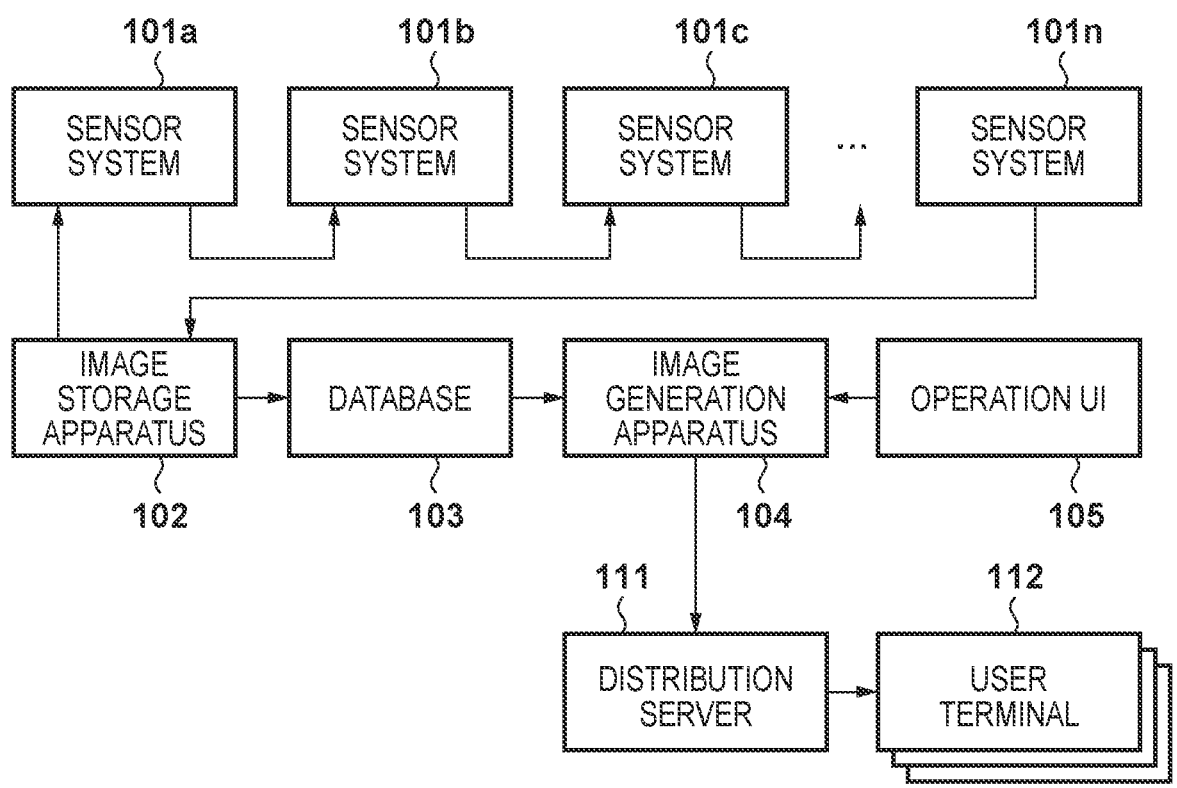
FIGS. 1A to 1B illustrate a configuration example of a panoramic image generation system.

Hereinafter, embodiments will be described in detail with reference to the attached drawings. Note, the following embodiments are not intended to limit the scope of the disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

In the present specification, the term "image" includes a static image formed of a single frame, and a video or movie formed of a plurality of frames. A panoramic image according to the present embodiment is an image including images in a predetermined range of directions (a plurality of eye directions) with the base point (reference position relating to generation of panoramic images) being the view point position. The panoramic image generation system of the present embodiment also allows for generating a panoramic image in an arbitrary range up to 360 degrees. Although generation of a 360-degree panoramic image will be described in the following embodiments, a 180-degree panoramic image may also be generated, for example. In addition, it is assumed in the present embodiment that the panoramic image is a continuum of images of images corresponding to a plurality of eye directions obtained by changing the eye direction in three dimensions, such as a spherical image. However, panoramic images are not limited thereto and may include, for example, images with eye directions in a range of 360 degrees in the horizontal direction. On the display apparatus, an image in an arbitrary eye direction included in a range of eye directions corresponding to a panoramic image can be obtained from the panoramic image. In other words, an image displayed on the display apparatus is a part of the panoramic image and the part of the panoramic image to be displayed can be arbitrarily designated. Here, the entire panoramic image may be displayed on the display apparatus.

First Embodiment

In a first embodiment, there will be described a process of generating a panoramic image enlarged in an arbitrary direction from multi-viewpoint images generated by shooting a subject with a plurality of cameras.

Configuration of Panoramic Image Generation System

Figure 1B:
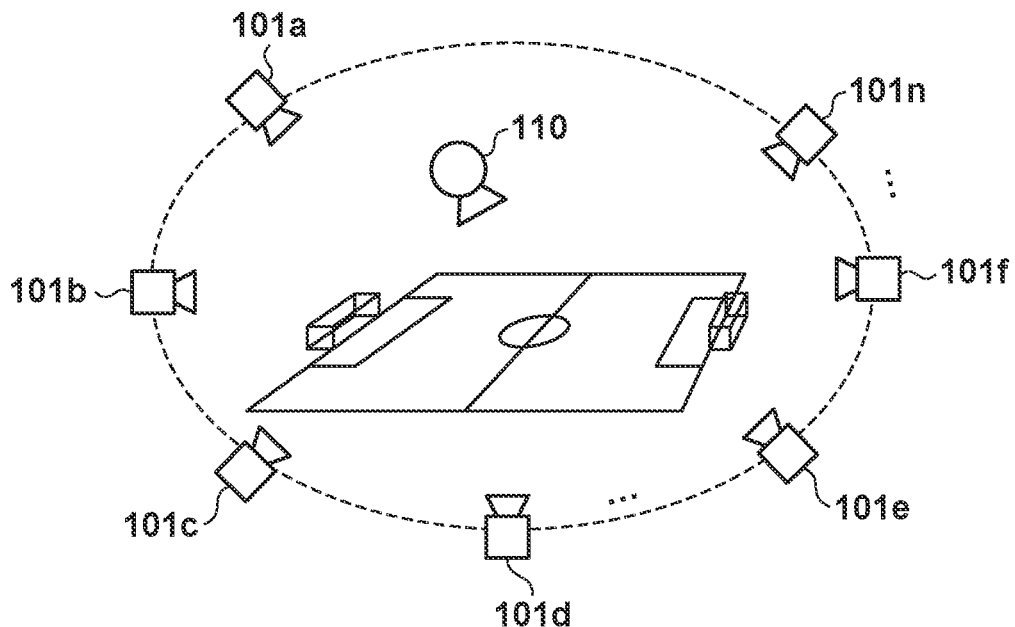

First, there will be described an overall configuration of a panoramic image generation system. FIGS. 1A to 1B illustrate a configuration example of a panoramic image generation system according to a first embodiment. FIG. 1A illustrates a system configuration of the panoramic image generation system. The panoramic image generation system includes n sensor systems 101a, 101b, . . . , and 101n, and each sensor system includes at least one camera (image capture apparatus). Unless otherwise stated, the n sensor systems 101a, 101b, . . . , and 101n are collectively referred to as sensor systems 101.

FIG. 1B illustrates an installation example the sensor system 101. The sensor systems 101 are installed in a manner surrounding a subject. In this example, with a field of a stadium being the object, then sensor systems 101 are installed in a manner surrounding the subject. Here, the installation position of the sensor systems is not limited to a stadium. For example, it is also possible to install a plurality of sensor systems in a studio or the like. Respective cameras of the sensor systems 101 capture images of the subject in synchronization. The images captured by synchronous image capturing performed by the plurality of cameras are referred to as multi-viewpoint images. Here, the sensor systems 101 also include microphones (not illustrated) in addition to the cameras, respectively. Respective microphones of the sensor systems 101 collect sound in synchronization. Although description of sound is omitted for simplicity, image and sound are basically supposed to be processed together.

An image storage apparatus 102 obtains multi-viewpoint images from the sensor systems 101 and writes the multi-viewpoint images into a database 103. The database 103 accumulates the multi-viewpoint images and provides the multi-viewpoint images to an image generation apparatus 104. An operation UI 105 operates the base point and the enlargement direction used for generation of the panoramic image. For example, the base point position (coordinates) and the enlargement direction (vector) are notified to the image generation apparatus 104 as enlargement information. Here, the enlargement information is not limited thereto and may include the focal distance or the like of a virtual camera.

The operation UI 105 can use, for example, a keyboard, a tablet, a joystick or the like, as an input device. In the first embodiment, the base point position (coordinates) and the enlargement direction (vector) of the panoramic image are designated using a numerical input by a keyboard or the like. For numerical inputs in the present embodiment, values of respective components (x, y, z) in the coordinate system are used, which will be described below, referring to FIG. 3A. A user designates, by the operation UI 105, the position (coordinates) and the enlargement direction (vector) based on the values of respective components in the coordinate system. Here, any numerical input may be used without any limitation on its specific configuration, and numerical values (coordinates, vectors) stored in a file or a memory, for example, may be read out.

The image generation apparatus 104 obtains multi-viewpoint images from the database 103 and enlargement information from the operation UI 105, and uses them to generate a virtual camera 110 (also referred to as virtual viewpoint). A virtual camera is a hypothetical camera which is different from a plurality of image capture apparatuses actually installed around an imaging area, presenting a concept for conveniently explaining a virtual viewpoint associated with generation of a virtual viewpoint image. In other words, a virtual viewpoint image can be regarded as an image captured from a virtual viewpoint set in a virtual space associated with an imaging area. Accordingly, the position and orientation of a viewpoint in virtual imaging can be expressed as the position and orientation of a virtual camera. In other words, assuming that a camera exists at a position of a virtual viewpoint set in the space, a virtual viewpoint image may be regarded as an image simulating an image captured by the camera. However, it is not essential to use the virtual camera concept in order to achieve the configuration of the present embodiment. In other words, it suffices to set at least information representing a specific position and information representing an orientation in a space, and generate a virtual viewpoint image in accordance with the set information. Details of the virtual camera 110 will be described below, referring to FIGS. 3A to 3F.

The image generation apparatus 104 provides a plurality of virtual cameras 110, renders a plurality of virtual viewpoint images, and generates a panoramic image with the plurality of virtual viewpoint images. The image generation apparatus 104 of the present embodiment generates a panoramic image enlarged in a designated direction. Details of the processes executed by the image generation apparatus 104 will be described below, referring to FIGS. 4A to 4E, FIG. 5, and FIGS. 6A to 6F. The image generation apparatus 104 transmits the generated panoramic image to a distribution server 111. A plurality of user terminals 112 such as smartphones or tablets receive and display the panoramic image from the distribution server 111. Each user uses the user terminals 112 to view the panoramic image in respective desired directions. Viewing the panoramic image in an enlargement-designated direction causes an enlarged image to be displayed on the user terminals 112. An example view of the panoramic image will be described below, referring to FIGS. 6A to 6F.

Configuration of Image Generation Apparatus 104

Next, a configuration of the image generation apparatus 104 in the panoramic image generation system of the first embodiment will be described, referring to FIGS. 2A to 2B. FIG. 2A is a block diagram illustrating a functional configuration example of the image generation apparatus 104. The image generation apparatus 104 combines these illustrated functions to generate a panoramic image enlarged in an arbitrary direction.

An enlargement information obtaining unit 201 obtains, from the operation UI 105, a base point position (coordinates) and an enlargement direction (vector) of the panoramic image as enlargement information. Here, the enlargement information is not limited thereto. For example, the focal distance, the magnification rate of enlargement, or the like, of the virtual camera in the enlargement direction may be designated as the enlargement information. A three-dimensional model generation unit 202 obtains multi-viewpoint images (image data) from the database 103, and generates a three-dimensional shape model (hereinafter, three-dimensional model) representing a three-dimensional shape of the object in the imaging area from the obtained multi-viewpoint images. The three-dimensional model is generated according to a shape estimation method such as, for example, Visual Hull, and constituted by a point group. A virtual camera generation unit 203 generates a plurality of virtual cameras required for generating panoramic images. A method for encompassing the entire periphery of a panoramic image by a plurality of virtual cameras will be described below, referring to FIGS. 4A to 4E.

A rendering unit 204 renders a virtual viewpoint image from a three-dimensional model based on position, attitude, focal distance or the like of the virtual camera. Specifically, the rendering unit 204 selects a multi-viewpoint image for each point constituting in the three-dimensional model, and obtains appropriate pixel values from the multi-viewpoint image to perform a coloring process. The rendering unit 204 then places the pixel values in the three-dimensional space, and renders a virtual viewpoint image by projecting them onto the virtual camera. In this manner, the rendering unit 204 renders a plurality of virtual viewpoint images corresponding to the plurality of virtual cameras which are generated by the virtual camera generation unit 203 and facing different directions. Here, a focal distance of a virtual camera according to the present embodiment is supposed to correspond to an enlargement rate of a virtual viewpoint image. In other words, the longer the focal distance of the virtual camera is, the smaller the angle of view of the virtual camera and the larger the enlargement rate of the virtual viewpoint image become. For example, doubling the focal distance of the virtual camera approximately halves the angle of view of the virtual camera, and approximately doubles the size of the subject reflected on the virtual viewpoint image. Here, the focal distance of the virtual camera is an abstract concept used to represent the enlargement rate of the virtual viewpoint image, and need not be completely identified with the focal distance of the lens of the actual camera.

A panoramic image generation unit 205 instructs the virtual camera generation unit 203 to generate a virtual camera, and instructs the rendering unit 204 to render as many virtual viewpoint images as the number of the virtual cameras. The panoramic image generation unit 205 then generates a panoramic image using the plurality of virtual viewpoint images. The processes and a generation example of the panoramic image will be described below, referring to FIGS. 4A to 4E, FIG. 5, and FIGS. 6A to 6F. An image output unit 206 transmits the generated panoramic image to the distribution server 111.

Next, a hardware configuration of the image generation apparatus 104 will be described. FIG. 2B is a block diagram illustrating a hardware configuration of the image generation apparatus 104. A Central Processing Unit (CPU) 211 processes using programs and data stored in a Random Access Memory (RAM) 212 or a Read Only Memory (ROM) 213. The CPU 211 executes respective processes to control the overall operation of the image generation apparatus 104 and generate panoramic images. The ROM 213 holds programs and data. The RAM 212 includes a work area for temporarily storing programs and data read out from the ROM 213. In addition, the RAM 212 provides a work area to be used when the CPU 211 executes each process.

The input unit 214 accepts input information from the operation UI 105, for example. An external interface 215 transmits and receives information to and from the database 103 and the operation UI 105 via a Local Area Network (LAN), for example. For example, the external interface 215 transmits panoramic images to the distribution server 111 via Ethernet (trade name). An output unit 216, including, for example, a display, a speaker or the like, outputs the generated virtual viewpoint images, panoramic images or the like to the operation UI 105 as information that are needed for operator operation.

Figure 3A:
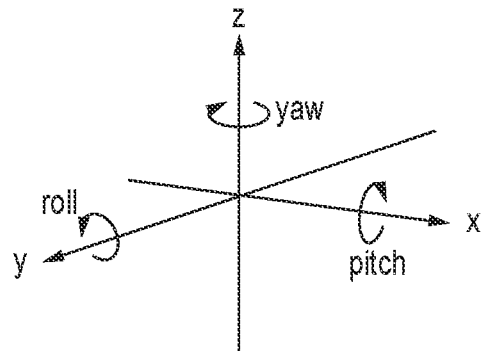
FIGS. 3A to 3F are explanatory diagrams of a base point position and an enlargement direction of a panoramic image.

Position and Attitude of Virtual Camera, Base Point Position and Enlargement Direction for Panoramic Image Referring to FIGS. 3A to 3F, there will be described a position and an attitude of a virtual camera, as well as a base point position and an enlargement direction of a panoramic image. The position and the attitude of the virtual camera, as well as the base point position and the enlargement direction of the panoramic image are expressed using a common coordinate system. FIG. 3A illustrates the common coordinate system of interest. As illustrated, a rectangular coordinate system in a general three-dimensional space formed of X, Y, and Z axes is used as the coordinate system. The coordinate system is set and used for the subject.

Figure 3B:
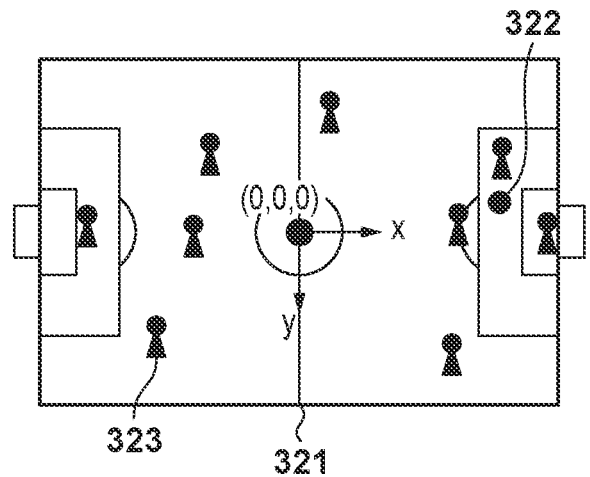

In the present embodiment, the subject is a field of a stadium, a studio, or the like. The subject includes the whole of a field 321 of a stadium, a ball 322, players 323 existing thereon, as illustrated in FIG. 3B. Here, customers around the field may also be included in the subject. In order to set a coordinate system to the field 321 which is the subject, the center of field 321 is defined as the origin (0, 0, 0). In addition, the X axis is defined as the long-side direction of the field 321, the Y axis as the short-side direction of the field 321, and the Z axis as the vertical direction with respect to the field 321. Here, the method of setting the coordinate system is not limited thereto.

Figure 3C:
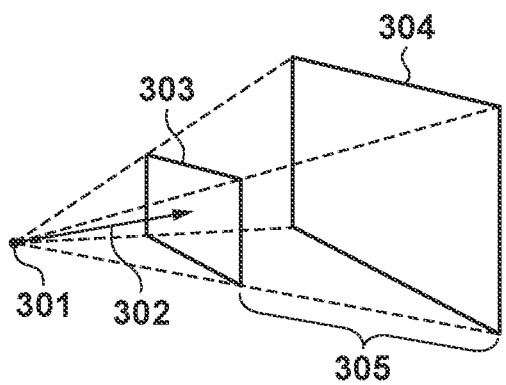
Figure 3D:
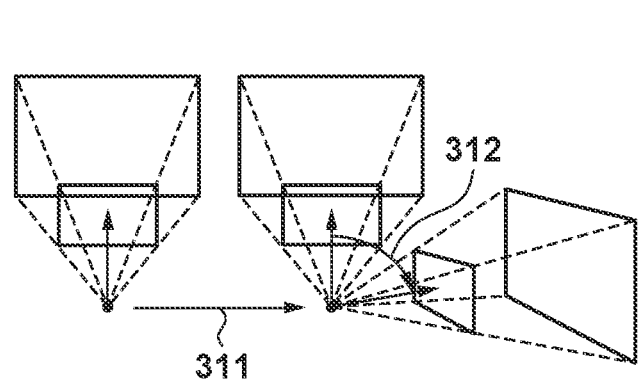

Next, the virtual camera will be described, referring to FIGS. 3C and 3D. The virtual camera is a viewpoint for rendering a virtual viewpoint image. In the quadrangular pyramid illustrated in FIG. 3C, the vertex represents a position 301 of a virtual camera, and the vector extending from the vertex represents an attitude 302 of the virtual camera. Therefore, the position of the virtual camera is represented by coordinates (x, y, z) in the three-dimensional space, and the attitude is expressed by a unit vector having scalar of each coordinate component along respective axes. The attitude 302 of the virtual camera passes through a center point of a front clipping plane 303 and a back clipping plane 304. In addition, a space 305 sandwiched between the front clipping plane 303 and the back clipping plane 304 is referred to as a view frustum of the virtual camera. The view frustum turns out to be a range in which the rendering unit 204 renders virtual viewpoint images (range in which virtual viewpoint images are projected).

Next, movement and rotation of the virtual camera will be described, referring to FIG. 3D. The virtual camera can move and rotate in a space expressed by three-dimensional coordinates. Movement of the position 301 of the virtual camera is represented by the components (x, y, z) along respective axes. A rotation 312 of the virtual camera is represented by Yaw, i.e., a rotation about the Z-axis, Pitch, i.e., a rotation about the X-axis, and Roll, i.e., a rotation about the Y-axis, as illustrated in FIG. 3A. Accordingly, it is possible to express a virtual camera freely moving and rotating in the three-dimensional space of the subject (field). Movement and rotation of the virtual camera are also used for replication of a virtual camera described below, referring to FIGS. 4A to 4E.

Figure 3E:
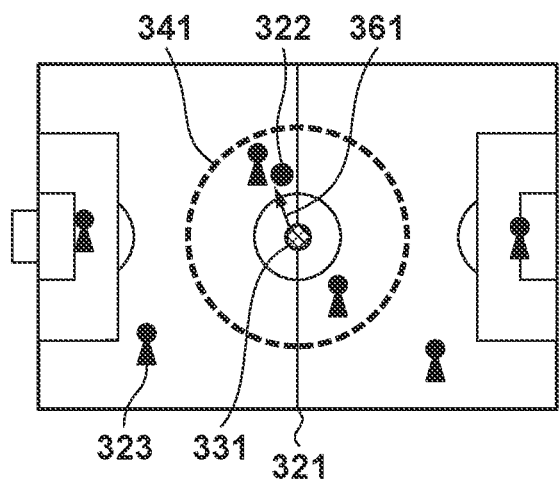

Finally, the base point position and the enlargement direction of a panoramic image will be described, referring to FIGS. 3E and 3F. The base point position of a panoramic image, which is the center point for generating the panoramic image, is expressed by the coordinates (x, y, z) in the three-dimensional space. For example, coordinates 331 (x1, y1, z1) near the center circle of the field 321 in FIG. 3E are designated. For example, setting the base point position as the coordinates 331, the focal distance of a conventional (without enlargement direction) panoramic image lies on a circle 341 as illustrated in FIG. 3E. In other words, conventional panoramic images turn out to be images with a same focal distance in any direction.

A panoramic image having an enlargement direction will be described. The enlargement direction of the panoramic image is expressed by a unit vector in a three-dimensional space. For example, in FIG. 3F, a direction 352 is designated as the enlargement direction. In FIG. 3F, the direction 352, which points toward the right goal direction in the subject, can be expressed by a unit vector (1, 0, 0) in the three-dimensional space. The focal distance of the panoramic image turns out to be a pattern 351, for example, in a case where the coordinates 331 are set as the base point position and the direction 352 is set as the enlargement direction. Comparison of the panoramic image of FIG. 3F with the conventional panoramic image of FIG. 3E indicates that, although the base point position (coordinates 331) is the same, the focal distance of the panoramic image of FIG. 3F has a shape (pattern 351) such that the focal distance is longer in the direction 352 from the circle 341 (direction toward the right goal). A panoramic image generated at such a focal distance turns out to be an image enlarged in the direction 352. A generation example of such a panoramic image will be described below, referring to FIGS. 6A to 6F.

The base point position and the enlargement direction described above are notified from the operation UI 105 to the image generation apparatus 104 as enlargement information. As the designation method of the information, a user operation such as numerical input by a keyboard, or a touch operation by a touch panel, or the like are employed. As has been described above, numerical input (not illustrated) is used in the first embodiment. The designation method using a touch panel will be described in a second embodiment. Here, the base point position and the enlargement direction can be changed at any time. For example, they may be updated as the soccer game proceeds.

Figure 3F:
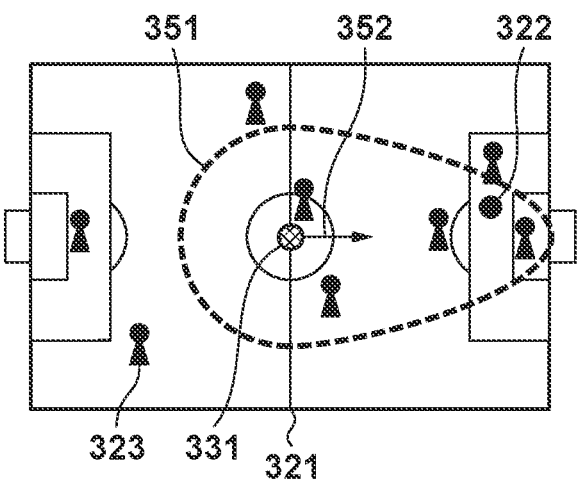

In the example of FIG. 3F described above, coordinates 331 (x1, y1, z1) are designated as the base point position, and a unit vector (1.0, 0.0, 0.0) as the enlargement direction, using a numerical input, for example. It goes without saying that the base point position and the enlargement direction that can be designated are not limited thereto, and an arbitrary value can be designated. For example, a unit vector (− 0.866025, 0.5, 0.0) or the like is designated in a case where it is desired to designate the base point position as the coordinates 331 and designate a direction toward the vicinity of the right lower corner of the field as the enlargement direction in FIG. 3F.

In the image generation apparatus 104, the enlargement information obtaining unit 201 obtains the enlargement information from the operation UI 105, and the virtual camera generation unit 203 generates a plurality of virtual cameras. The rendering unit 204 renders virtual viewpoint images in the plurality of virtual cameras, and the panoramic image generation unit 205 uses the plurality of virtual viewpoint images to generate a panoramic image.

Process of Generating a Plurality of Virtual Cameras

Referring to FIGS. 4A to 4E, a process performed by the virtual camera generation unit 203 to generate a plurality of virtual cameras will be described. As illustrated in FIG. 2A, the virtual camera generation unit 203 in the image generation apparatus 104 receives enlargement information including the base point position and the enlargement direction relating to the panoramic image via the enlargement information obtaining unit 201. The virtual camera generation unit 203 generates, based on the enlargement information, a plurality of virtual cameras required for generating a panoramic image. Here, although the virtual camera generation unit 203 generates a single virtual camera when rendering an ordinary two dimensional virtual viewpoint image, it generates a plurality of virtual cameras for rendering the entire periphery in an all-encompassing manner when generating a panoramic image.

First, generation of a virtual camera for a panoramic image without any enlargement direction will be described, and subsequently generation of a virtual camera for a panoramic image having enlargement directions (panoramic image enlarged in at least one direction) will be described. In the following, there will be described an example in which six virtual cameras are generated for a panoramic image without any enlargement direction, and an example in which ten virtual cameras are generated for a panoramic image having enlargement directions. Here, the number of virtual cameras generated by the virtual camera generation unit 203 is not particularly limited. In addition, the number of virtual cameras to be generated may be changed in accordance with the number of enlargement directions.

First, generation of six virtual cameras for generating a panoramic image without any enlargement direction will be described, referring to FIGS. 4A and 4B. The virtual camera generation unit 203 sets the base point position of the received panoramic image to the position of each virtual camera. The virtual camera generation unit 203 then sets six directions, namely front, back, left, right, up and down to respective attitudes of the six virtual cameras. The entire periphery is covered by the six virtual cameras.

Figure 4A:
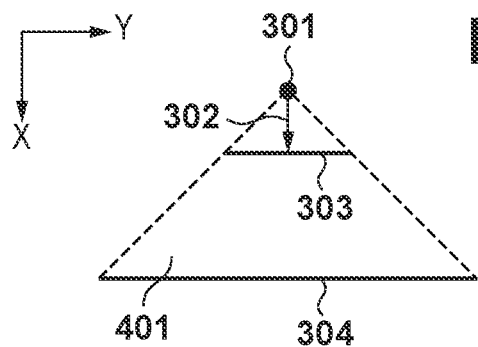
FIGS. 4A to 4E are explanatory diagrams of a process of generating a plurality of virtual cameras.

FIG. 4A illustrates a single virtual camera 401 seen from the Z-axis (top). The virtual camera 401 is provided at the position 301, with the unit vector (1, 0, 0) in the X-axis direction indicating the attitude 302. Hereinafter, the direction of the attitude 302 is defined as the frontward direction. The virtual camera generation unit 203 generates the other five virtual cameras by rotating the virtual camera 401 in the frontward direction by 90 degrees about the Z-axis (yaw direction) and the Y-axis (roll direction), respectively.

Figure 4B:
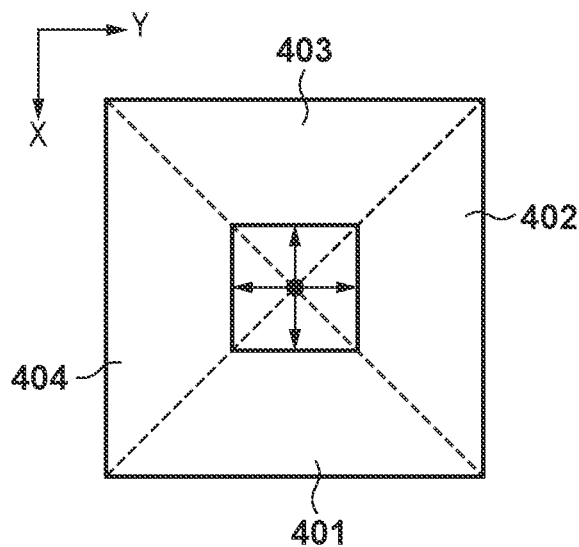

FIG. 4B, which is a view seen from the Z-axis (top), illustrates the front-facing virtual camera 401 illustrated in FIG. 4A, together with other virtual cameras 402, 403, and 404 facing leftward, backward and rightward, respectively. The attitude of the virtual camera 402, facing leftward, is a unit vector in the Y-axis direction (0, 1, 0). The attitude of the virtual camera 403, facing backward, is a unit vector in the −X-axis direction (− 1, 0, 0). The attitude of the virtual camera 404, facing rightward, is a unit vector in the −Y-axis direction (0, −1, 0). The virtual cameras are generated by rotating the virtual camera 401 by 90 degrees in the yaw direction. Similarly, rotating the front-facing virtual camera 401 by 90 degrees in the roll direction generates virtual cameras 405 and 406 (not illustrated in FIG. 4B) in upward and downward directions. The attitude of the virtual camera 405, facing upward, is a unit vector in the Z-axis direction (0, 0, 1). The attitude of the virtual camera 406, facing downward, is a unit vector in the −Z-axis direction (0, 0, −1).

Figure 4D:
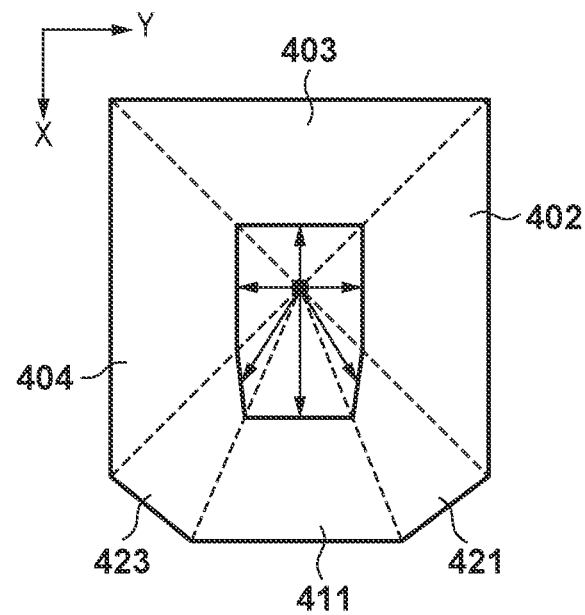
Figure 4C:
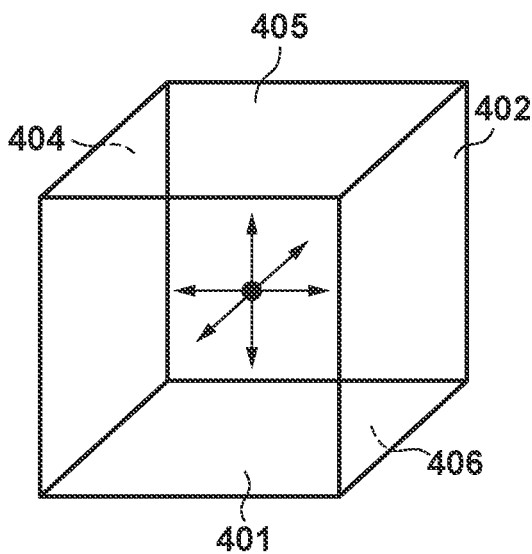

FIG. 4C illustrates the virtual cameras 401 to 406 whose attitude and position are set as described above. For simplicity, only the position, the attitude, and the back clip plane of each virtual camera are illustrated. As illustrated in FIG. 4C, the clipping planes of the virtual cameras 401 to 406 are square, with an assembly of the clipping planes being continuous like surfaces of a cube. In other words, the pixels along the boundary between the clipping planes turn out to be continuous. This is because other virtual cameras are replicated from the front-facing virtual camera 401 with a square clipping plane, using only a 90-degree rotation. Rendering and composing virtual viewpoint images using the virtual cameras allows for obtaining a continuous panoramic image.

Here, in a case where no enlargement direction is designated, a predetermined focal distance is applied to each of the virtual cameras. The virtual cameras 401 to 406, having no enlargement direction designated thereto, turn out to be respectively located on the circle 341 illustrated in FIG. 3E and have a same predetermined focal distance set to all of them.

Next, there will be described a plurality of virtual cameras for generating a panoramic image enlarged in at least one direction. Here, there will be described a process of generating 10 virtual cameras for a panoramic image having enlargement directions, based on the six virtual cameras for a panoramic image without any enlargement directions.

The virtual camera generation unit 203 sets the base point position (position 301) of the panoramic image received from the operation UI 105 to a position common to respective virtual cameras. Subsequently, according to the process described above, the virtual camera generation unit 203 sets the six directions, namely front, back, left, right, up and down to each of the attitudes of the six virtual cameras. The virtual camera generation unit 203 then sets the enlargement direction of the received panoramic image to be the frontward direction described above. However, setting of the enlargement direction is not limited to the frontward direction. It suffices to set a virtual camera whose attitude coincides with the enlargement direction as a virtual camera in which focal distance is set longer than other virtual cameras. Additionally, in a case where a plurality of enlargement directions are designated, the attitude of the virtual camera may be decided in accordance with those plurality of enlargement directions.

FIG. 4D is a view of a virtual camera seen from the Z-axis (top), similarly to FIG. 4B. The virtual cameras 402 to 404 face leftward, backward, and rightward, similarly to FIG. 4B. Setting a longer focal distance for the virtual camera 411 facing the enlargement direction (front) than the other virtual cameras allows for rendering a virtual viewpoint image in which a distant subject is enlarged. Whereas the focal distance increases, the rendering range of the virtual camera 411 facing the enlargement direction becomes narrower. Assuming that the clipping plane of the virtual camera 411 is a square, one side thereof turns out to be shorter than the other virtual cameras 402 to 406. Therefore, a gap appears between the rendering range of the virtual camera 411 and that of the other virtual cameras 402 to 406.

Figure 4E:
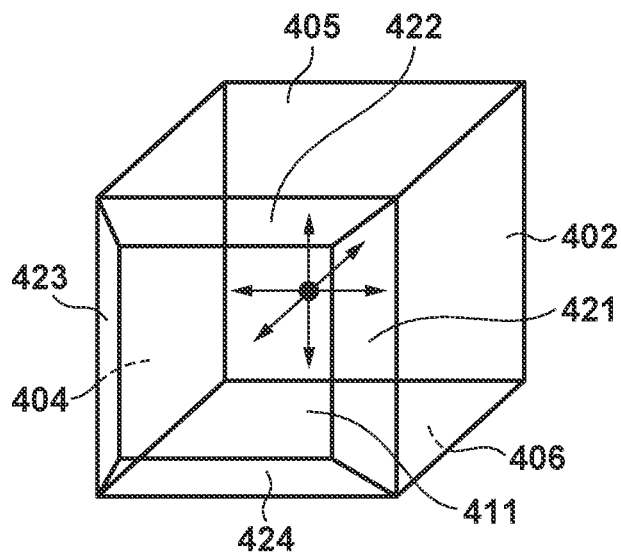

Therefore, the virtual camera generation unit 203 complements the gap using yet other four virtual cameras 421 to 424, as illustrated in FIGS. 4D and 4E. FIG. 4E illustrates the virtual cameras 401 to 406 and 421 to 424 whose position, attitude, and enlargement direction have been set as described above. Similarly to FIG. 4C, for simplicity, only the position, the attitude, and the back clipping plane of each of the virtual cameras are illustrated in FIG. 4E. Here, it suffices to set a value between the virtual camera 411 and the virtual cameras 402 to 406 as the focal distance of the virtual cameras 421 to 424 used for complementation. In addition, although an example is illustrated in which complement is performed using four virtual cameras for ease of explanation in the present example, the number of virtual cameras for complementation is not limited to four. There may also be a setting such as subdividing the gap in the rendering range and complement the subdivisions using a plurality of virtual cameras, and gradually changing the focal distance of the virtual cameras for complementation.

Note that although an example of representing a space as a cube using a plurality of virtual cameras has been described, the present disclosure is not limited thereto. For example, a space may be expressed as a regular dodecahedron by preparing twelve virtual cameras and cutting out an image from a captured multi-viewpoint image into a pentagonal shape. In other words, the virtual camera generation unit 203 generates a plurality of virtual cameras arranged at a same position with different attitudes, respectively. Subsequently, a focal distance of at least one of the plurality of virtual cameras (virtual camera whose attitude coinciding with the enlargement direction) is set as a second focal distance which is larger than the first focal distance of the other virtual cameras. Additionally, in order to complement the virtual viewpoint image, the virtual camera generation unit 203 sets, between the virtual camera having the second focal distance set thereto and the virtual camera having the first focal distance set thereto, virtual cameras (e.g., virtual cameras 421 to 424) having a third focal distance between the second focal distance and the first focal distance. Here, as the virtual cameras having the third focal distance, there may be arranged a plurality of virtual cameras corresponding to a plurality of focal distances gradually approaching to the first focal distance from the second focal distance.

Rendering Process of Virtual Viewpoint Image

The rendering unit 204 renders virtual viewpoint images corresponding to a plurality of virtual cameras generated by the virtual camera generation unit 203 as described above. Here, a focal distance of at least one of the plurality of virtual cameras (the virtual camera 411 in the present example) is set as the second focal distance which is larger than the first focal distance of the other virtual cameras. The rendering unit 204 obtains a plurality of virtual viewpoint images including partially enlarged virtual viewpoint images, by rendering a plurality of virtual viewpoint images obtained from a plurality of virtual cameras in mutually different directions. In other words, the rendering unit 204 renders, in cooperation with the virtual camera generation unit 203, an image of enlarged state in comparison with the virtual viewpoint images corresponding to other virtual cameras, for at least some part of the virtual viewpoint images corresponding to at least one of the plurality of virtual cameras.

Generation Process of Panoramic Image

Figure 5:
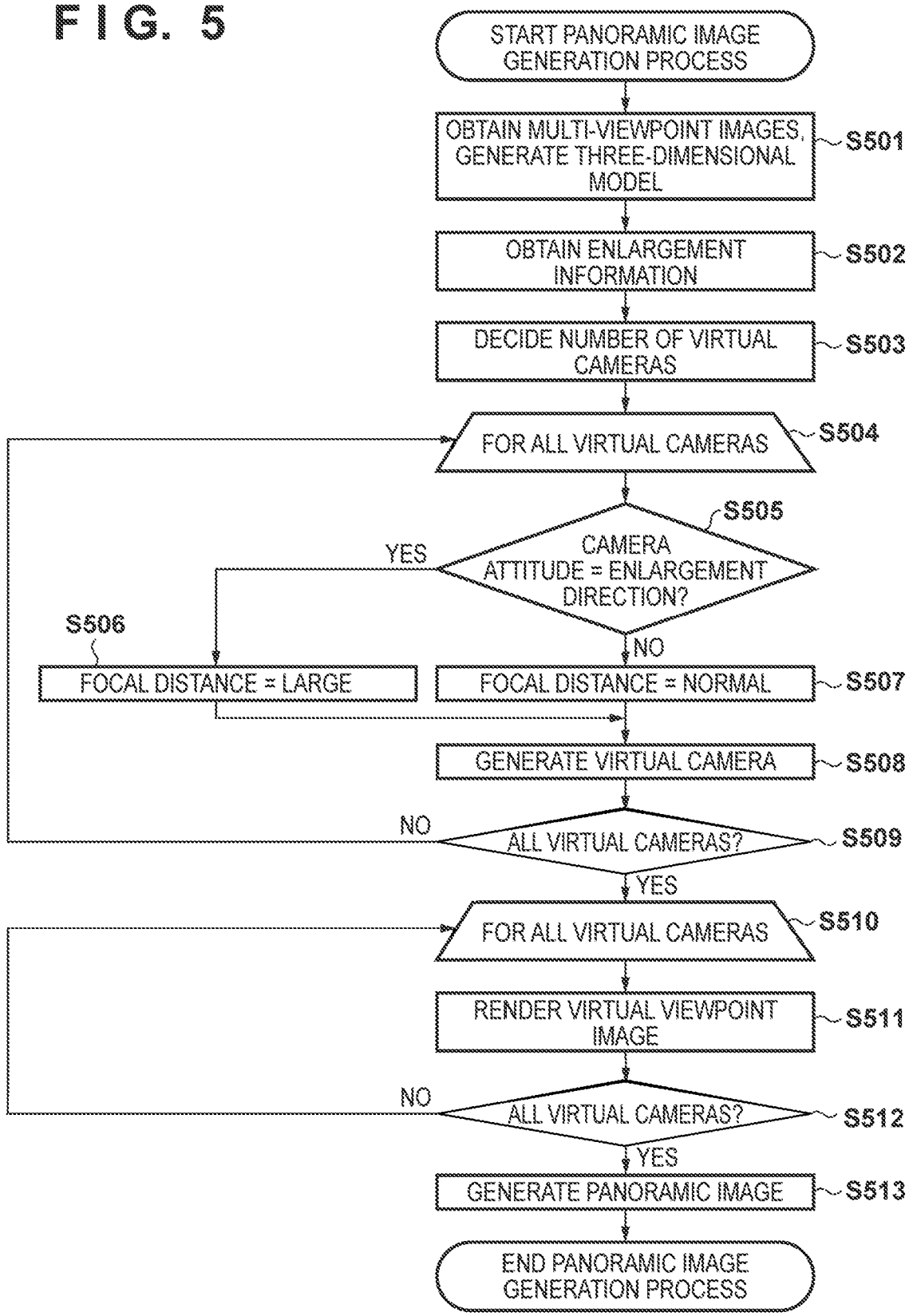
FIG. 5 is a flowchart illustrating a generation process of a panoramic image.

Next, a process of generating a panoramic image by the image generation apparatus 104 will be described, referring to FIG. 5 and FIGS. 6A to 6F. The image generation apparatus 104 generates a panoramic image enlarged in an arbitrary direction by rendering virtual viewpoint images using the plurality of virtual cameras described above, and composing the virtual viewpoint images. FIG. 5 is a flowchart illustrating a generation process of a panoramic image according to the first embodiment. FIGS. 6A to 6F illustrate an example of a panoramic image generated by the process described by the flowchart of FIG. 5 and an example of a virtual viewpoint image used to generate the panoramic image. Here, although the process is realized by cooperation of the enlargement information obtaining unit 201, the three-dimensional model generation unit 202, the virtual camera generation unit 203, the rendering unit 204, and the panoramic image generation unit 205, it is assumed that the panoramic image generation unit 205 supervises respective units.

At step S501, the three-dimensional model generation unit 202 generates a three-dimensional model using multi-viewpoint images obtained from the database 103. At step S502, the enlargement information obtaining unit 201 obtains enlargement information from the operation UI 105. The enlargement information includes, as previously described, base point positions and enlargement directions required to generate a panoramic image. At step S503, the virtual camera generation unit 203 decides the number of virtual cameras to be generated, based on the enlargement information obtained at step S502.

In the example of FIGS. 4A to 4E, ten virtual cameras are generated in a case where a single enlargement direction has been designated in the enlargement information. Here, although the number of virtual cameras to be generated by the virtual camera generation unit 203 in a single enlargement direction is five in FIGS. 4A to 4E (virtual camera 411 and 421 to 424), the number is not limited thereto as described above. In addition, it is also conceivable to prevent the total number of virtual cameras to be generated from being too large by changing the number of virtual cameras per enlargement direction in accordance with the total number of enlargement directions (e.g., the larger the total number of enlargement directions, the smaller the number of virtual cameras per enlargement direction). Naturally, the larger the total number of enlargement directions is, the more virtual cameras may be generated.

At steps S504 to S509, the virtual camera generation unit 203 generates as many virtual cameras as the number decided at step S503. The processing at steps S504 to S509 is repeated as many times as the number of virtual cameras decided at step S503 while changing the attitude of the virtual camera generated.

At step S505, the virtual camera generation unit 203 determines whether or not the attitude of the virtual camera to be generated is in the enlargement direction. In the examples of FIGS. 4A to 4E, the frontward direction is set as the enlargement direction. When the determination result is True, the process proceeds to step S506. When the determination result is False, the process proceeds to step S507. At step S506, the virtual camera generation unit 203 sets a large value to the focal distance of the virtual camera to be generated. Specific values of the focal distance may be included in the enlargement information designated from the operation UI 105, for example, or may be designated by the user by the operation UI 105. Alternatively, a predetermined value may be set as a large focal distance.

At step S507, the virtual camera generation unit 203 sets a normal value to the focal distance of the virtual camera to be generated. The normal value, which is a focal distance set for a virtual camera which is not designated to be in the enlargement direction, is shorter than the focal distance of a virtual camera in the enlargement direction. At step S508, the virtual camera generation unit 203 generates a virtual camera based on the focal distance set at step S506 or step S507. Here, generation of respective virtual cameras is as described referring to FIGS. 4A to 4E.

The processing at steps S510 to S512, which is a rendering process of virtual viewpoint images performed by the rendering unit 204, is repeated as many times as the number of virtual cameras generated at steps S504 to S509. At step S511, the rendering unit 204 renders a virtual viewpoint image using the three-dimensional model obtained at step S501 and the virtual camera generated at step S508. The rendering unit 204 renders a plurality of virtual viewpoint images by repeating the rendering process for a plurality of virtual cameras generated by the virtual camera generation unit 203. The rendering process of a virtual viewpoint image performed by the rendering unit 204 is as described referring to FIG. 2A. At step S513, the panoramic image generation unit 205 composes a plurality of virtual viewpoint images rendered at steps S510 to S512, and generates a panoramic image. The image output unit 206 outputs the panoramic image thus generated to the distribution server 111. Here, information indicating enlargement directions may also be output together with the panoramic image. For example, the user terminal 112 can control so that an enlargement direction output together with the panoramic image turns out to be the first display part when displaying the panoramic image.

Figure 6A:
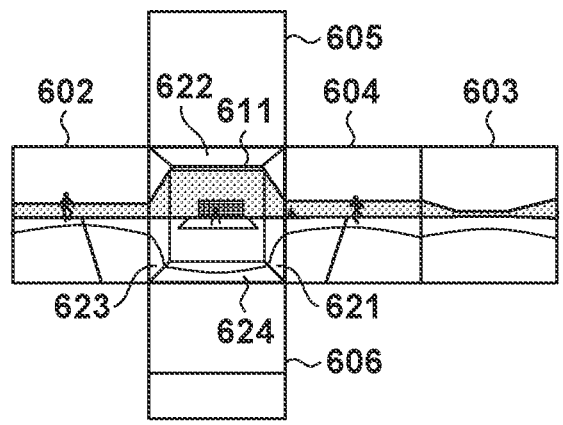
FIGS. 6A to 6F illustrate a generation example and a display example of a panoramic image.
Figure 6B:
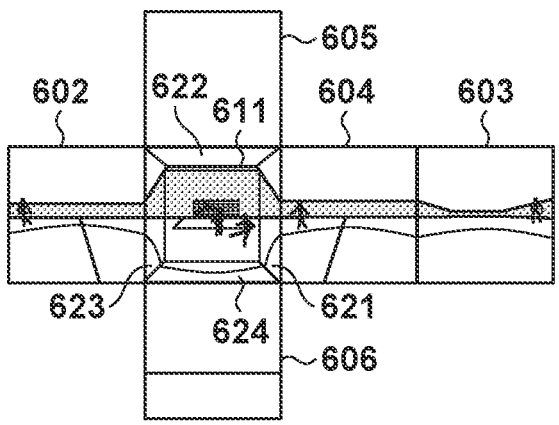

Next, a generation example of a panoramic image will be described, referring to FIGS. 6A to 6F. Taking as an example the case illustrated in FIG. 3F in which the base point position is the coordinates 331 and the enlargement direction is the direction 352, the plurality of virtual viewpoint images to be rendered by the rendering unit 204 turn out to be as illustrated in FIGS. 6A and 6B. The five virtual viewpoint images 602 to 606 in FIGS. 6A and 6B are virtual viewpoint images rendered using the virtual cameras 402 to 406 illustrated in FIGS. 4D and 4E (corresponding to rightward, backward, leftward, upward and downward directions, in sequence). A virtual viewpoint image 611 is a virtual viewpoint image rendered using the virtual camera 411 in the enlargement direction. Virtual viewpoint images 621 to 624 in the periphery thereof are virtual viewpoint images rendered using the virtual cameras 421 to 424.

In FIG. 6B, a scene of trying a shoot in front of the goal is rendered as the virtual viewpoint image 611. In FIG. 6B, it can be seen that the sizes of a player near the center of field in the virtual viewpoint images 602 and 604 rendered at a normal focal distance, and a player in front of the goal in the virtual viewpoint image 611 rendered at a large focal distance in the enlargement direction are approximately the same. In the soccer field, which is an example of the subject of the present embodiment, the distance from the center of field to the front of the goal is about 40 to 50 m. It can be seen that the virtual viewpoint image 611 in the enlargement direction is sufficiently enlarged compared to the virtual viewpoint images 602 to 604, or the like, in the other directions.

Figure 6C:
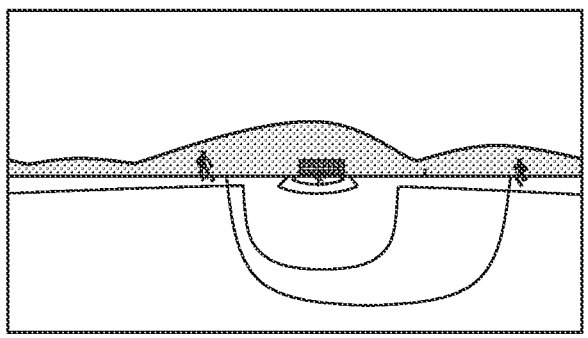
Figure 6D:
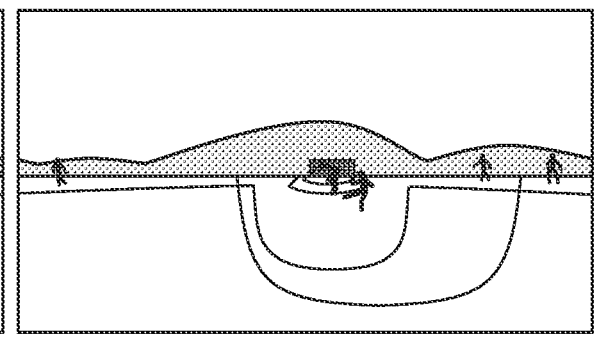

The panoramic image generation unit 205 generates a panoramic image from the composed virtual viewpoint image. In the present embodiment, a panoramic image is generated by associating, pixel by pixel, the composed virtual viewpoint image with the format of the panoramic image. The format of the panoramic image is equirectangular projection, or the like. Pixel-by-pixel association is performed by creating a correspondence table according to the format. With regard to the correspondence table, it suffices to apply a method such as associating a spherical globe with a planar map, for example. An example of generating a panoramic image from the plurality of virtual viewpoint images of FIGS. 6A and 6B using such a correspondence table is illustrated in FIGS. 6C and 6D. An example of displaying such a panoramic image on the user terminal 112 will be described below. It goes without saying that the correspondence table may also be used in a case where a base point position or an enlargement direction are changed. In addition, the corresponding table may be preliminarily stored in the RAM 212 or the like. Here, at step S512 of FIG. 5, the panoramic image generation unit 205, when generating a panoramic image, may embed an identifier indicating that an enlargement direction is included and/or an identifier indicating an enlargement direction for the panoramic image in header information of the image.

As has been described above, according to the first embodiment, a panoramic image enlarged in at least one direction is generated from the multi-viewpoint images captured by a plurality of cameras. In other words, a panoramic image including images in directions within a predetermined range based on a specific position (base point position) in an imaging area is generated, the panoramic image having an enlargement rate of an image in a specific direction (enlargement direction) included in the predetermined range which is larger than the enlargement rates of images in other directions. Since the panoramic image includes a panoramic image being enlarged as described above, a user observing in the enlargement direction does not need to perform an enlargement operation on a terminal such as a smartphone or a tablet. In addition, in a case of using a configuration for generating an enlarged image included in the panoramic image by rendering a virtual viewpoint image with an increased focal distance, the perceived resolution will not decrease in the enlarged image, unlike the process of performing enlarged display by a general pinch operation on the terminal.

Display Example of Panoramic Image on User Terminal

An example of displaying a panoramic image generated as described above on the user terminal 112 will be described. The panoramic image generated by the image generation apparatus 104 is transmitted to the distribution server 111 and received and displayed by the plurality of user terminals 112. The user terminals 112 are, for example, tablets, smartphones, or the like. The distribution server 111 provides the user terminal 112 with the panoramic image by streaming or a file in MP4 format or the like. Here, the types of the user terminals 112 or the providing format from the distribution server 111 are not limited thereto. The user terminal 112 detects rotation by a gyro sensor and decides the display direction in the panoramic image in accordance with the detected rotation direction.

The present embodiment uses the panoramic image enlarged in at least one direction described above. As a result, when the user terminal faces the enlargement direction of the panoramic image while changing the display area in accordance with the rotation direction, the user terminal can display an area with a significantly increased focal distance. The enlargement rate gradually increases when moving from a direction in which the image is generated as a normal focal distance to an enlargement direction, or gradually decreases when moving away from the enlargement direction. The aforementioned display will be described next.

Referring to FIGS. 6C to 6F, display examples of panoramic images on the user terminal 112 will be described. FIGS. 6C and 6D respectively illustrate panoramic images generated from the plurality of virtual viewpoint images illustrated in FIGS. 6A and 6B, the panoramic images being output from the image generation apparatus 104 to the distribution server 111. Both of the panoramic images are generated at the base point position (coordinates 331) and in the enlargement direction (direction 352) illustrated in FIG. 3F. It is assumed that the two panoramic images are generated at separate timings, i.e., FIG. 6C illustrating a timing at which the ball is near the center circle, and FIG. 6D illustrating a subsequent timing at which the ball is passed to the front of the goal and a shoot is attempted.

Figure 6E:
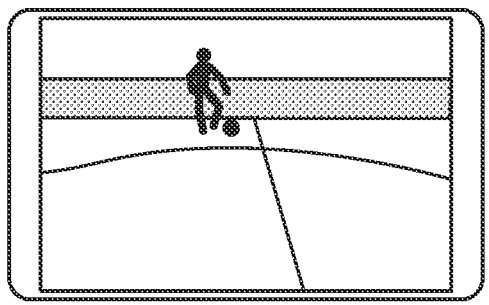
Figure 6F:
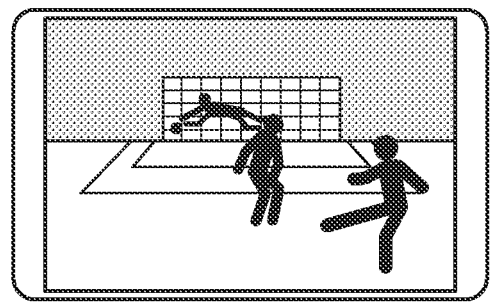

FIGS. 6E and 6F are display examples of panoramic images on the user terminal 112. FIG. 6E is an example of displaying the panoramic image of FIG. 6C, and FIG. 6F is an example of displaying the panoramic image of FIG. 6D. FIG. 6E, illustrating a scene in which the ball is near the center of field, is a display example of a panoramic image when the rotation direction of the user terminal 112 faces a direction 361 in FIG. 3E. On the screen, there is displayed a player with a ball in the direction 361. Although the direction 361 being displayed is rendered not in the enlargement direction (direction 352), but at a normal focal distance, it is displayed in a sufficient size since the subject player is near the center of field.

FIG. 6F, illustrating a scene in which the ball is shot in front of the goal, is a display example of a panoramic image when the rotational direction of the user terminal 112 faces the enlargement direction of FIG. 3F (direction 352, right goal side). The screen displays the shoot scene in the direction 352, which is the enlargement direction. Since the enlargement direction being displayed is rendered at a larger-than-normal focal distance, the subject players are displayed with a sufficient size even when they are distant from the center of field by about 40 to 50 m.

As has been described above, according to the first embodiment, enlargement of the panoramic image is performed in the image generation apparatus 104, and therefore it is not necessary to execute enlarged display on the user terminal 112. For example, let us assume a user terminal 112 having a function of displaying a partial image corresponding to a designated observation direction, among the panoramic images in a predetermined range based on the base point position (specific position). As has been described above, the enlargement rate of the partial image to be displayed on the user terminal 112 in accordance with designation of an observation direction coinciding with the enlargement direction (specific direction) is larger than the enlargement rate of the partial image displayed in accordance with designation of other directions. The embodiment described above therefore allows for displaying the subject in an enlarged manner by only designating the observation direction (e.g., rotating the user terminal) using the user terminal 112, which is a general apparatus that displays a panoramic image.

Note that, in the present embodiment, although the sensor system 101 communicates with adjacent sensor systems, and only the sensor systems 101a and 101n are connected to the image storage apparatus 102, the present disclosure is not limited thereto. For example, all the sensor systems 101 may be connected to the image storage apparatus 102.

As has been described above, the first embodiment allows for generating a panoramic image in which the subject is enlarged in an arbitrary direction with a simple operation. For example, it is possible to generate a panoramic image in which only each goal direction is enlarged with the center of field being the base point, when performing image capturing of a professional sports game such as soccer or the like being played in a stadium. Such a panoramic image allows the viewer to both survey the entire field and see an up-close view of a climax scene in front of the goal, from a view point as though standing in the center of field.

Note that although an enlarged virtual viewpoint image is obtained by setting a virtual camera with a long focal distance in a predetermined direction in the present embodiment, the present disclosure is not limited thereto. Providing an enlargement effect to at least one of the virtual viewpoint images obtained from a plurality of virtual cameras having a same focal distance, such those as illustrated in FIGS. 4B and 4C, may allow for rendering of at least some of the virtual viewpoint images in an enlarged manner. In such a case, however, there is a possibility that perceived resolution in the enlarged image may decrease.

Second Embodiment

In a second embodiment, there will be described a method of designating a base point position and an enlargement direction of a panoramic image using a touch panel. The second embodiment and the first embodiment are different in terms of the designation method of the base point position and the enlargement direction of the panoramic image. Although the base point position and the enlargement direction are designated by numerical input in the first embodiment, the second embodiment allows the user to designate the enlargement direction more intuitively and easily using a touch panel. Here, the configurations of the panoramic image generation system (FIGS. 1A to 1B) and the image generation apparatus 104 (FIGS. 2A to 2B), and respective processes in the image generation apparatus 104 (FIGS. 3A to 3F, FIGS. 4A to 4E, FIG. 5, and FIGS. 6A to 6F) are similar to those of the first embodiment.

Referring to FIGS. 7A to 7E, there will be described a method of designating a base point position (coordinates) and an enlargement direction (vector) of a panoramic image, using a touch panel. The operation UI 105 of the second embodiment employs a device including a touch panel. For example, the device may be a tablet, a smartphone, or the like.

Figure 7A:
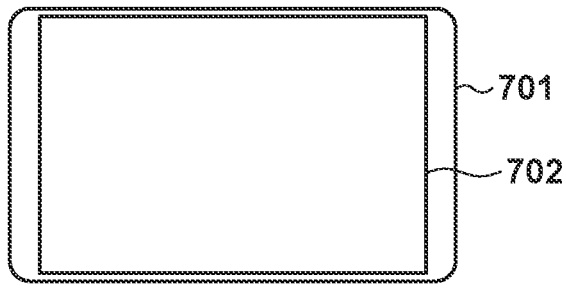
FIGS. 7A to 7E illustrate an operation example of designating an enlargement direction of a panoramic image.

Referring to FIG. 7A, there will be described designation from a tablet, which is the operation UI 105. In FIG. 7A, a tablet 701 includes a touch panel display 702. For example, the touch panel display 702 may be implemented by laminating touch panels on an LCD apparatus that can display images. Here, although the tablet 701 may include, in addition to the touch panel display 702, a CPU, a RAM, an acceleration sensor, and a gyro sensor, descriptions thereof will be omitted since it is of a common hardware configuration of a tablet. The touch panel display 702 detects a touch operation and operated position coordinates. The touch panel display 702 notifies \the CPU (not illustrated) of detected touch operations and position coordinates at a regular interval.

The CPU of the tablet 701 determines what type of operation has been performed on the touch panel and decides operational coordinates thereof, based on the notification information from the touch panel display 702. For example, the CPU determines that touch operations are touching on the touch panel display 702 with a finger or a pen (hereinafter, referred to as "touch-in"), moving while keeping touching with a finger or a pen (hereinafter, "drag"), releasing the finger or pen that was touching (hereinafter, "touch-out"), or the like.

The CPU determines that a touch operation is a tap operation when a touch-in and a touch-out are performed in a short period of time. When a touch-in and a touch-out are performed at different coordinates at an interval exceeding a predetermined time, they are determined to be a swipe operation or a drag operation. In response to the operations, the base point position and the enlargement direction of the panoramic image are designated. Note that touch operations to be determined are not limited thereto. Here, any type of touch panel may be chosen used from a variety of types, such as resistive film, electrostatic capacity, surface acoustic wave, infrared, electromagnetic induction, light sensor, or the like.

Referring to FIGS. 7B to 7E, there will be described a method of designating a base point position and an enlargement direction of a panoramic image using a tablet including a touch panel display. In any of the methods, the touch panel display 702 displays a bird's-eye view image 703 of the subject. The bird's-eye view image 703 of the subject, which is obtained by rendering the entire field from above, allows for easily grasping the positional relation on the field. In the present example, the subject exists in the field in the stadium, including a ball 711 and a person 712 thereon.

The bird's-eye view image 703 is an image of the entire field, which is the subject, captured from above. In order to capture an image of the entire field from above (in the Z direction), a virtual camera may be set at the position, or a physical camera provided at an upper stage of audience seats or on the ceiling of the stadium may be used. In any case, the image generation apparatus 104 in the second embodiment is supposed to provide the operation UI 105 with a bird's-eye view image. Although two designation methods will be specifically described below, the base point positions and the enlargement directions to be designated are respectively assumed to be the same, for comprehensibility. Here, the setting method of enlargement information including base point positions and enlargement directions using a touch panel is not limited thereto.

Designation Process of Base Point Position and Enlargement Direction for Panoramic Image: Case 1

Figure 7B:
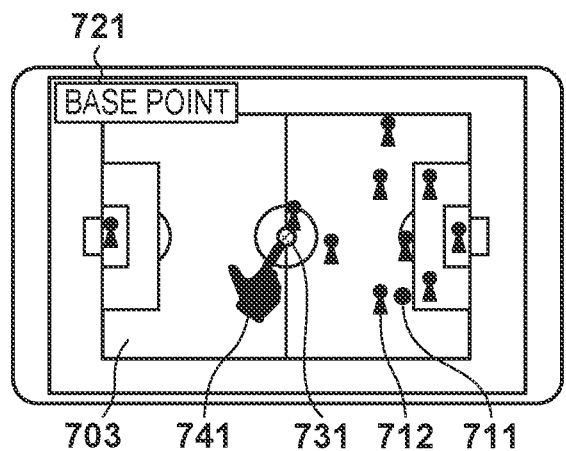

A first designation method will be described, referring to FIGS. 7B and 7C. The first designation method is one that uses tap operation on a touch panel. Using a plurality of tap operations, a base point position (coordinates) and an enlargement direction (vector) are designated in sequence. A menu presenting the designation content (base point position or enlargement direction) is displayed on the top left of the screen, so as to guide the operation sequence. First, a base point position is accepted, as illustrated in the menu 721 in FIG. 7B. In the example of FIG. 7B, coordinates 731 near the center of field have been designated by the touch position of a tap operation 741.

Figure 7C:
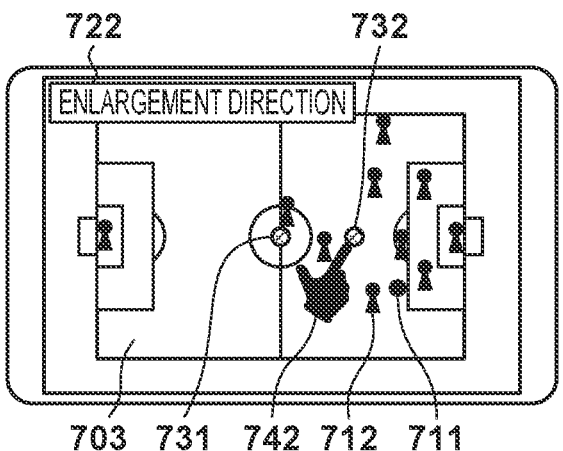

Next, an enlargement direction is accepted, as illustrated in the menu 722 in FIG. 7C. The example of FIG. 7C is an example in which coordinates 732 at the right goal side from near the center of field have been designated by a tap operation 742. With regard to the enlargement direction, a vector (e.g., 1, 0, 0) connecting the coordinates 731 previously designated as the base point position and the coordinates 732 designated for an enlargement direction turns out to be the enlargement direction.

Here, a plurality of tap operations may be accepted while displaying the menu 722 that accepts designation of an enlargement direction, so as to allow for designation of a plurality of enlargement directions. For example, when coordinates (not illustrated) in the left goal direction are tapped after coordinates 732 in the right goal direction described above have been tapped, both goal directions (e.g., (1, 0, 0) and (− 1, 0, 0)) may be designated as enlargement directions, based on the coordinates 731 of the center of field.

Designation Process of Base Point Position and Enlargement Direction for Panoramic Image: Case 2

A second designation method will be described, referring to FIGS. 7D and 7E. In the second designation method uses a move operation of the touch position on the touch panel. In the present embodiment, a swipe operation on the touch panel is used. Using a swipe operation, a base point position (coordinates) and an enlargement direction (vector) are designated in sequence. A menu presenting the designation content is displayed on the top left of the screen, so as to guide the operation sequence. The designation method using swipe designates a base point position by a touch-in, and designates an enlargement direction by coordinates of the touch-out following movement of a finger or the like kept in contact with the touch panel after the touch-in.

Figure 7D:
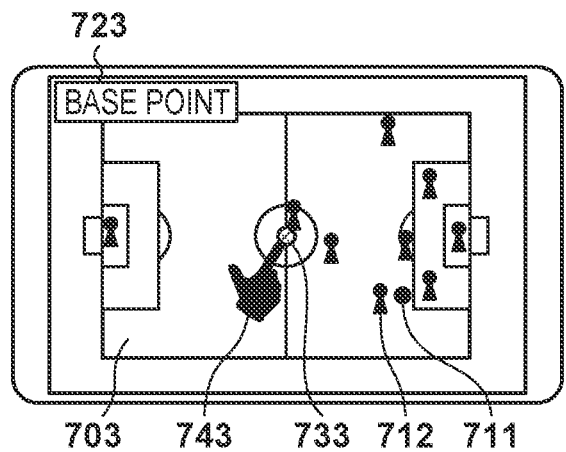

First, a base point position is accepted, as illustrated in the menu 723 of FIG. 7D. In the second designation method, coordinates at the time of touch-in are obtained and used as the base point position. The example of FIG. 7B describing the first designation method has used coordinates from taps (a series of operation in which touch-ins and touch-outs are performed in a short time) instead of touch-ins. Here, it is assumed as an example that the coordinates 733 of the center of field are designated by the touch-in 743.

Figure 7E:
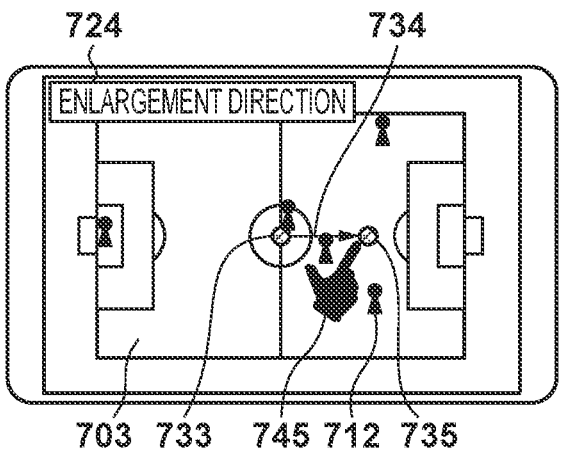

After having detected the touch-in, the screen turns out to accept an enlargement direction, as illustrated in the menu 724 in FIG. 7E. From the touch-in illustrated in FIG. 7D, the finger or the like is moved in an arbitrary direction while keeping the finger or the like in contact with the touch panel, and an enlargement direction is designated by the direction of movement. The example of FIG. 7E is an example of performing a touch-out 745 at coordinates 735 after having moved from the coordinates 733 of the touch-in to the right goal side. The direction of movement during the touch (e.g., vector (1, 0, 0)) turns out to be designated as the enlargement direction. Here, the line connecting the coordinates 733 of the touch-in and the coordinates 735 of the touch-out may be regarded as the enlargement direction.

Note that, in any of the methods, a cancel button (not illustrated) may be provided so as to allow for canceling and resetting the designated base point positions and enlargement directions. In addition, the designation method of a base point position and an enlargement direction of a panoramic image using a touch panel is not limited to touch operations or swipe operations (drag operations). Any operation that can be realized using a touch panel may be employed, without being limited thereto. In addition, the focal distance (enlargement rate) may be designated in accordance with the distance between positions designated by tap operations (e.g., the distance between the coordinates 731 and 732), or the moving distance (moving amount) of a swipe operation. For example, a larger focal distance may be designated when the distance between designated positions or the moving distance is long, or a small focal distance may be designated when the moving distance is short.

Using the designation method through a touch panel as described above allows for intuitively and easily designating a base point position (coordinates) and an enlargement direction (vector) of a panoramic image. Enlargement information designated in the aforementioned manner is transmitted to the image generation apparatus 104. The enlargement information obtaining unit 201 of the image generation apparatus 104 receives the enlargement information from the user terminal 112. The virtual camera generation unit 203 and the rendering unit 204 use the received enlargement information to generate a panoramic image enlarged in at least one direction by the method described in the first embodiment.

Here, the setting method of a base point position and an enlargement direction is not limited to the examples described above. For example, a base point position may be set based on the position of the object detected in the imaging area, and the enlargement direction may be set based on the orientation of the object. Specifically, the position of a person in the imaging area may be set as the base point position, and the orientation of the person's face or body may be set as the enlargement direction.

In addition, the base point is not limited to a single fixed position, and the base point may move continuously. In this case, panoramic images of a video are generated in accordance with the continuously moving base point.

Third Embodiment

In the first embodiment, a panoramic image including an enlarged image has been generated by generating virtual viewpoint images including the enlarged image. In a third embodiment, a panoramic image is enlarged in an arbitrary direction after the panoramic image has been generated. Note that although an example of executing a process of enlarging a part of the panoramic image by the distribution server 111 is described in the third embodiment, the present disclosure is not limited thereto. For example, the image generation apparatus 104 may execute a process of enlarging a part of a panoramic image after having generated the panoramic image.

The process of generating a panoramic image by the image generation apparatus 104 is similar to the first embodiment. However, unlike the first embodiment, the operation UI 105 only designates only a base point position of a panoramic image and does not designate an enlargement direction, for the image generation apparatus 104. Therefore, the image generation apparatus 104 generates a panoramic image without an enlargement direction. The distribution server 111 performs an enlargement process on the received panoramic image.

Referring to FIG. 8, there will be described an enlargement process of a panoramic image in the distribution server 111. At step S801, the distribution server 111 receives a panoramic image from the image generation apparatus 104. In the present embodiment, the panoramic image at this time point does not include an enlarged part. At step S802, the distribution server 111 accepts designation of an enlargement direction. Designation of the enlargement direction is performed by, for example, connecting, to the distribution server, an operation UI which is similar to the operation UI 105 connected to the image generation apparatus 104. Designation of the enlargement direction may use the numerical input described in the first embodiment, or the designation method using a touch panel described in the second embodiment. In addition, it is also possible to designate a plurality of enlargement directions, similarly to the first and the second embodiments. In addition, the image generation apparatus 104 may notify the distribution server 111 of the enlargement direction designated by the operation UI 105.

At steps S803 to S805, the distribution server 111 enlarges the part of the panoramic image obtained at step S801, based on the enlargement direction obtained at step S802. The processing at steps S803 to S805 is repeated as many times as the number of enlargement directions. At step S804, the distribution server 111 executes an enlargement process using image processing on the partial area of the panoramic image corresponding to the enlargement direction obtained at step S802. The image processing mentioned here uses a method of exerting a fish eye effect on the partial area corresponding to the enlargement direction of the panoramic image, with using distortion correction, for example. Here, any method may be used without being limited thereto, as long as it can exert an enlargement effect on the panoramic image.

Panoramic images generated in the third embodiment turn out to be similar to those of FIGS. 6B and 6D described in the first embodiment, the format of which is equirectangular projection or the like. However, enlargement in panoramic images of the present embodiment exerts an enlargement effect, subsequently by image processing, on the panoramic images generated in the image generation apparatus 104, and therefore the resulting image quality may turn out to be slightly degraded compared to the panoramic images generated in the first embodiment. Here, when exerting the enlargement effect at step S804, an identifier indicating inclusion of the enlargement direction for the panoramic image may be embedded in the header information of the image.

At step S806, the distribution server 111, in response to a request from the user terminal 112, distributes the panoramic image on which an enlarging effect has been exerted using image processing at steps S803 to S805. According to the processes described above, the distribution server 111 may generate a panoramic image having at least one enlargement direction. The delivered panoramic image can be displayed on the user terminal 112, similarly to the first embodiment. Here, information indicating the enlargement direction may be output together with the panoramic image, similarly to the first embodiment. The user terminal 112 can control the enlargement direction output together with the panoramic image to be the first display part when displaying the panoramic image. Since enlargement in the panoramic image of the third embodiment is performed by the distribution server 111, the user terminal 112 need not perform an enlarged display process. In other words, only rotating, similarly as conventional art, the user terminal 112 that displays general panoramic images allows for displaying a panoramic image including enlarged display such as that described for FIGS. 6E and 6F.

Fourth Embodiment

There has been described in the first and the third embodiments a configuration in which the user terminal 112 receives and displays a panoramic image a part of which (arbitrary direction) is enlarged. In a fourth embodiment, there will be described a configuration in which the user terminal 112 executes a process of enlarging the panoramic image in an arbitrary direction. In other words, in the fourth embodiment, the user terminal 112 accepts designation of an enlargement direction and enlarges the panoramic image in an arbitrary direction. Here, the process of generating a panoramic image (panoramic image not including enlarged images) is similar to that of the third embodiment.

The user terminal 112 of the fourth embodiment has a hardware configuration such as that illustrated in FIG. 2B. Here, the input unit 214 and the output unit 216 constitute a touch panel display, for example, and the user terminal 112 includes a gyro sensor (not illustrated). The gyro sensor detects a rotation direction of the user terminal 112. In the following, an enlarged display process of a panoramic image performed by the user terminal 112 will be described, referring to FIG. 9. In the enlarged display process of a panoramic image in the fourth embodiment, the user terminal 112 stores an enlargement direction, and performs enlarged display in a case where the display direction coincides with the enlargement direction. Here, the processes illustrated in FIG. 9 is supposed to be realized by executing, by the CPU 211 of the user terminal 112, a predetermined program stored in the ROM 213. However, a part or all of the processes illustrated in FIG. 9 may be realized by dedicated hardware.

At step S901, the user terminal 112 obtains a panoramic image from the distribution server 111. In the present embodiment, the panoramic image does not include an enlargement direction. At steps S902 to S910, the user terminal 112 displays the panoramic image obtained at step S901. The processing at steps S902 to S910 is repeated while display process of the panoramic image is being performed. At step S903, the user terminal 112 detects its rotation direction using the gyro sensor. Here, the configuration is not limited the use of a gyro sensor as long as it can detect rotation direction. At step S904, the user terminal 112 decides the display direction of the panoramic image, in accordance with the rotation direction obtained at step S903.

At step S905, the user terminal 112 determines whether or not the display direction decided at step S904 coincides with the enlargement direction stored in the memory (e.g., RAM 212). The enlargement direction will be described below at steps S907 and S908. As has been described above, steps S902 to S910 are repetitive processes, and storage of the enlargement direction is reflected from the next cycle. Here, the direction coincidence determination at step S905 may not be a perfect coincidence, and may be a coincidence determination provided with a predetermined margin. When the determination result is True, the process proceeds to step S909. When the determination result is False, the process proceeds to step S906.

At step S906, the user terminal 112 performs usual display of the panoramic image in the display direction decided at step S904. The display screen example of this occasion is similar to that of FIG. 6E. At step S909, the user terminal 112 performs enlarged display of the panoramic image. The display screen of this occasion is similar to that of FIG. 6F, for example. At step S907, the user terminal 112 accepts an enlargement designation. For the designation method of enlargement directions on the user terminal 112, the method described in the second embodiment (FIGS. 7A to 7E) can be used, for example. When an enlargement designation is accepted, the process proceeds to step S908. When no enlargement designation has been accepted, the process proceeds to step S910. At step S908, the user terminal 112 stores the display direction at the time of acceptance of the enlargement designation at step S907 in the memory (e.g., RAM 212) as the enlargement direction. Here, the image generation apparatus 104 or the distribution server 111 may provide the panoramic image with the enlargement direction, and the user terminal 112 may store in the memory to use the enlargement direction provided to the panoramic image.

At step S910, the user terminal 112 returns the process to step S902 while the display process of the panoramic image is continuing, and repeats the display process described above. Here, there may be provided a configuration that receives a release instruction of the enlargement direction. As has been described above, according to steps S905, S906, and S909, a display control for performing enlarged display of the image corresponding to the display direction of the panoramic image is realized in a case where the display direction corresponds to the enlargement direction held in the memory when displaying a panoramic image.

Using the processes described above allows for constantly performing enlarged display in the direction when viewing a panoramic image by designating enlargement in an arbitrary direction on the user terminal 112. However, enlargement of panoramic images of the present embodiment may result in a slightly degraded image quality compared to the panoramic images of the first embodiment, because panoramic images generated in the image generation apparatus 104 is enlarged and displayed by the user terminal 112.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-153187, filed on Aug. 23, 2019, which is hereby incorporated by reference herein in its entirety.

What is claimed is:

1. An image processing apparatus comprising:
one or more memories storing instructions; and
one or more processors executing the instructions to:
obtain image data based on image capturing by a plurality of image capture apparatuses configured to capture images in an imaging area from different positions;
generate viewpoint information for specifying a plurality of virtual cameras including a first virtual camera, a second virtual camera, and a third virtual camera, (i) a position of the first virtual camera, a position of the second virtual camera, and a position of the third virtual camera being the same, iii) a view direction of the first virtual camera, a view direction of the second virtual camera, and a view direction of the third virtual camera being different from each other, (iii) a focal length of the first virtual camera being longer than a focal length of the second virtual camera and a focal length of the third virtual camera, and (iv) the focal length of the second virtual camera being longer than the focal length of the third virtual camera;
generate, based on the obtained image data and the generated viewpoint information, a plurality of virtual images each of which corresponds to the plurality of virtual cameras, the plurality of virtual images including a first virtual image corresponding to the first virtual camera, a second virtual image corresponding to the second virtual camera, and a third virtual image corresponding to the third virtual camera; and
generate, based on the generated plurality of virtual images, a panoramic image including at least a part of the first virtual image, at least a part of the second virtual image, and at least a part of the third virtual image, the at least a part of the second virtual image being between the at least a part of the first virtual image and the at least a part of the third virtual image in the panoramic image.

2. The image processing apparatus according to claim 1, wherein
the one or more processors further execute the instructions to generate a three-dimensional shape model of an object in the imaging area based on the obtained image data, and
the plurality of virtual images is generated based on the generated three-dimensional shape model.

3. The image processing apparatus according to claim 1, wherein
the one or more processors further execute the instructions to set the position and the view direction of the first virtual camera based on a user operation, and
the panoramic image is generated based on the set position and the set view direction of the first virtual camera.

4. The image processing apparatus according to claim 3, wherein
the position and the view direction of the first virtual camera are set based on the user operation on a bird's-eye view image of the imaging area displayed on a display screen.

5. The image processing apparatus according to claim 4, wherein
the user operation includes a tap operation on a touch panel for designating the position of the first virtual camera and a swipe operation on the touch panel for designating the view direction of the first virtual camera.

6. The image processing apparatus according to claim 5, wherein
an enlargement rate of the first virtual image with respect to the third virtual image is set based on a moving amount of a touch position in a swipe operation on the touch panel.

7. The image processing apparatus according to claim 1, wherein
the one or more processors further execute the instructions to set the position of the first virtual camera based on a position of an object in the imaging area, and to set the view direction of the first virtual camera based on an orientation of the object.

8. The image processing apparatus according to claim 1, wherein
the panoramic image is an image according to equirectangular projection.

9. The image processing apparatus according to claim 1, wherein
a predetermined range includes horizontal 360-degree directions.

10. The image processing apparatus according to claim 1, wherein
the panoramic image is a spherical image.

11. The image processing apparatus according to claim 1, wherein
the panoramic image is a video.

12. A non-transitory computer-readable storage medium storing a program for causing a computer to execute an image processing method, the image processing method comprising:
obtaining image data based on image capturing by a plurality of image capture apparatuses configured to respectively capture images in an imaging area from different positions;
generating viewpoint information for specifying a plurality of virtual cameras including a first virtual camera, a second virtual camera, and a third virtual camera, (i) a position of the first virtual camera, a position of the second virtual camera, and a position of the third virtual camera being the same, (ii) a view direction of the first virtual camera, a view direction of the second virtual camera, and a view direction of the third virtual camera being different from each other, (iii) a focal length of the first virtual camera being longer than a focal length of the second virtual camera and a focal length of the third virtual camera, and (iv) the focal length of the second virtual camera being longer than the focal length of the third virtual camera;
generating, based on the obtained image data and the generated viewpoint information, a plurality of virtual images each of which corresponds to the plurality of virtual cameras, the plurality of virtual images including a first virtual image corresponding to the first virtual camera, a second virtual image corresponding to the second virtual camera, and a third virtual image corresponding to the third virtual camera; and
generating, based on the generated plurality of virtual images, a panoramic image including at least a part of the first virtual image, at least a part of the second virtual image, and at least a part of the third virtual image, the at least a part of the second virtual image being between the at least a part of the first virtual image and the at least a part of the third virtual image in the panoramic image.

13. An image processing method comprising:
obtaining image data based on image capturing by a plurality of image capture apparatuses configured to capture images in an imaging area from different positions;
generating viewpoint information for specifying a plurality of virtual cameras including a first virtual camera, a second virtual camera and a third virtual camera, (i) a position of the first virtual camera, a position of the second virtual camera, and a position of the third virtual camera being the same, (ii) a view direction of the first virtual camera, a view direction of the second virtual camera, and a view direction of the third virtual camera being different from each other, (iii) a focal length of the first virtual camera being longer than a focal length of the second virtual camera and a focal length of the third virtual camera, and (iv) the focal length of the second virtual camera being longer than the focal length of the third virtual camera;
generating, based on the obtained image data and the generated viewpoint information, a plurality of virtual images each of which corresponds to the plurality of virtual cameras, the plurality of virtual images including a first virtual image corresponding to the first virtual camera, a second virtual image corresponding to the second virtual camera, and a third virtual image corresponding to the third virtual camera; and
generating, based on the generated plurality of virtual images, a panoramic image including at least a part of the first virtual image, at least a part of the second virtual image, and at least a part of the third virtual image, the at least a part of the second virtual image being between the at least a part of the first virtual image and the at least a part of the third virtual image in the panoramic image.

* * * * *